United States Patent
Gibble et al.

(10) Patent No.: US 6,983,351 B2
(45) Date of Patent: Jan. 3, 2006

(54) SYSTEM AND METHOD TO GUARANTEE OVERWRITE OF EXPIRED DATA IN A VIRTUAL TAPE SERVER

(75) Inventors: Kevin L. Gibble, Tucson, AZ (US); Gregory T. Kishi, Oro Valley, AZ (US); Jonathan W. Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 10/120,911

(22) Filed: Apr. 11, 2002

(65) Prior Publication Data

US 2003/0196036 A1 Oct. 16, 2003

(51) Int. Cl.
*G06F 12/00* (2006.01)

(52) U.S. Cl. .......................... 711/159; 711/4; 711/112; 711/133; 711/136; 711/160

(58) Field of Classification Search ................ 711/4, 711/112, 133, 136, 159, 160
See application file for complete search history.

(56) References Cited

U.S. PATENT DOCUMENTS

| 6,289,425 | B1 | * | 9/2001 | Blendermann et al. | ...... 711/170 |
| 6,405,284 | B1 | * | 6/2002 | Bridge | ...... 711/114 |
| 6,513,101 | B1 | * | 1/2003 | Fisher et al. | ...... 711/159 |
| 6,658,526 | B2 | * | 12/2003 | Nguyen et al. | ...... 711/111 |

* cited by examiner

*Primary Examiner*—Donald Sparks
*Assistant Examiner*—Bao Q Truong
(74) *Attorney, Agent, or Firm*—John Kennel, Esq.; Scully, Scott, Murphy & Presser

(57) ABSTRACT

A system and method for guaranteeing overwrite of expired data in a media device, the data being organized according to logical units provided on media devices organized as physical volumes. The method comprises the steps of: maintaining information associated with a status of a physical volume, and updating a physical volume's status information based upon a combination of that volume's prior status and that volume's current status; specifying a time duration that expired logical unit data may remain on a physical volume; based upon the volume's updated status information, determining whether a selected volume has expired data longer than the specified time duration; and, overwriting contents of the volume having data that has expired longer than the specified time duration.

35 Claims, 7 Drawing Sheets

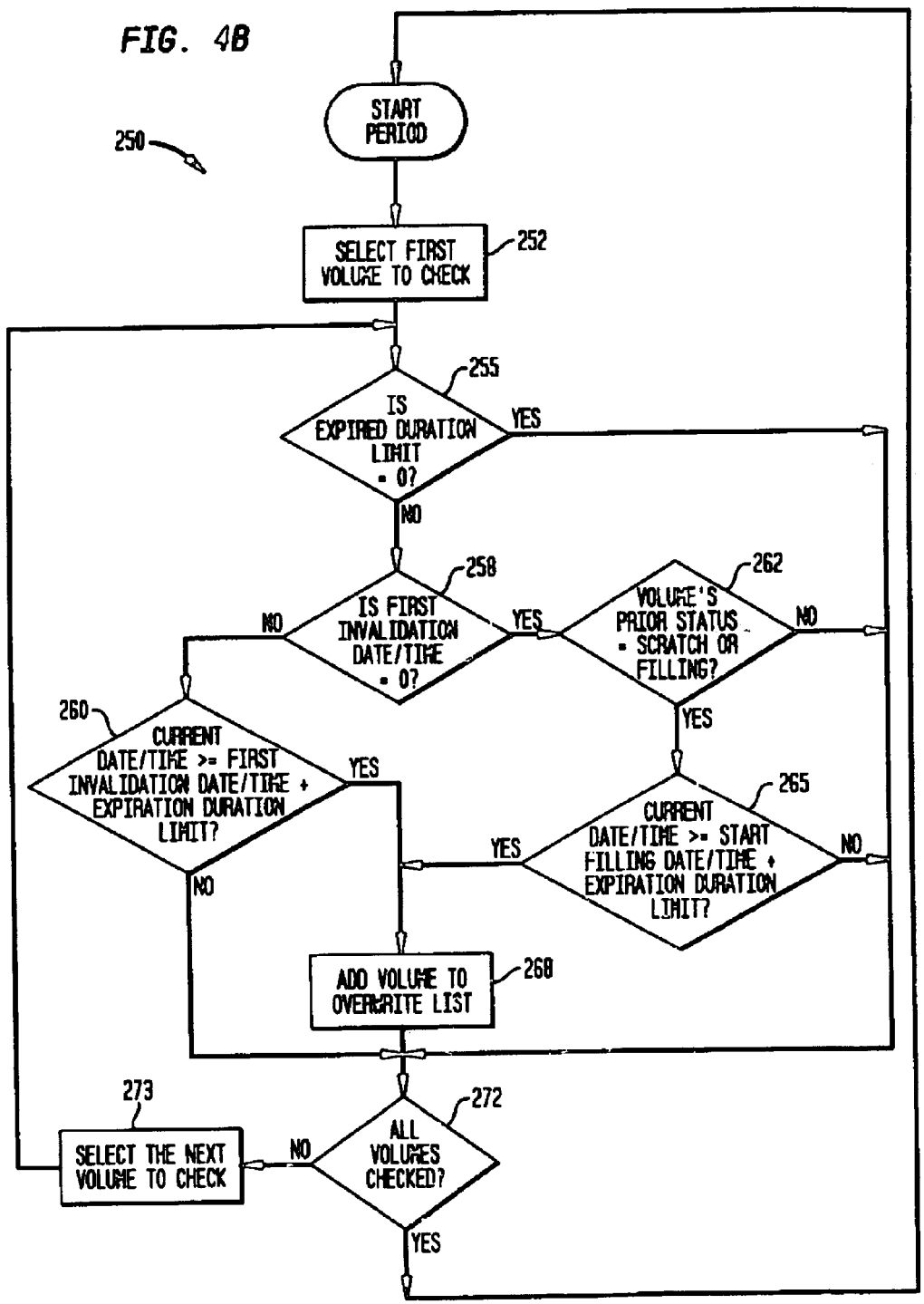

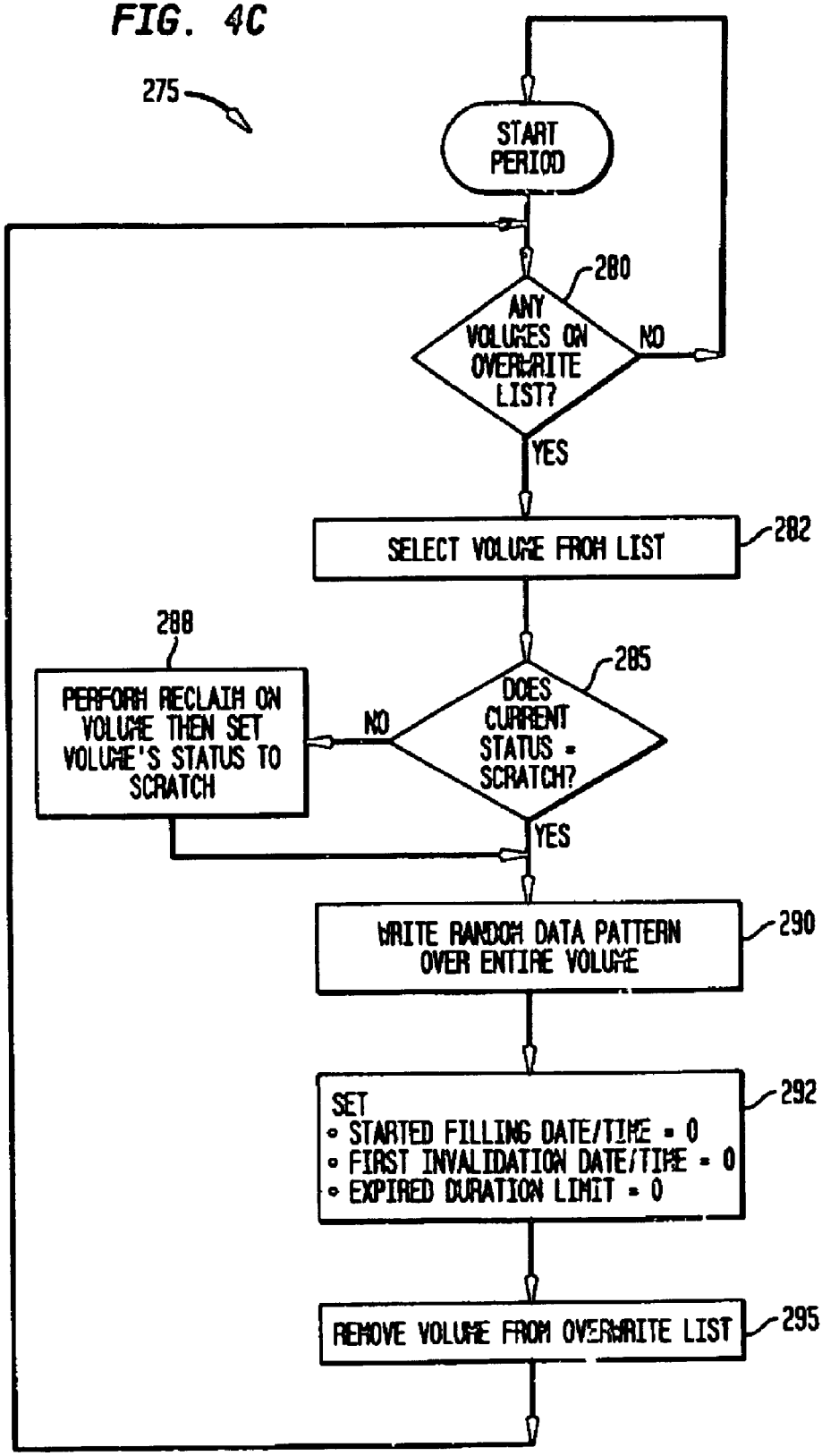

FIG. 5

| Current Status ↓ / Prior Status → | SCRATCH (312) | FILLING (314) | 100% FULL (316) | <100% FULL (318) |
|---|---|---|---|---|
| SCRATCH (302) | NONE | 1. SET SFD = CURRENT DATE/TIME<br>2. IF EDL=0, SET TO POOL'S SED<br>320 | 1. SET SFD = CURRENT DATE/TIME<br>2. SET FID = 0<br>3. SET EDL TO POOL'S SED | 1. SET SFD = CURRENT DATE/TIME<br>2. SET FID = CURRENT DATE/TIME<br>3. SET EDL TO POOL'S SED |
| FILLING (304) | NONE | NONE | 1. SET FID = 0<br>2. SET EDL TO POOL'S SED | 1. SET FID = CURRENT DATE/TIME<br>2. SET EDL TO POOL'S SED |
| 100% FULL (306) | 1. SET FID = CURRENT DATE/TIME | 1. SET SFD = CURRENT DATE/TIME<br>2. SET FID = CURRENT DATE/TIME | NONE | 1. SET FID = CURRENT DATE/TIME |
| <100% FULL (308) | NONE | 1. SET SFD = CURRENT DATE/TIME | 1. SET SFD = CURRENT DATE/TIME<br>2. SET FID = 0<br>3. SET EDL TO POOL'S SED | NONE |

SFD = STARTED FILLING DATE/TIME
FID = FIRST INVALIDATION DATE/TIME
EDL = EXPIRED DURATION LIMIT
SED = SECURITY ERASURE DURATION

SYSTEM AND METHOD TO GUARANTEE OVERWRITE OF EXPIRED DATA IN A VIRTUAL TAPE SERVER

BACKGROUND OF THE INVENTION

1. Field of the Invention

This invention relates generally to automated data storage systems, and particularly, to novel improvements in virtual tape server subsystems for ensuring that expired data is overwritten within a time interval set by a user.

2. Discussion of the Prior Art

A virtual tape system is a special storage device that manages data so that it appears to be stored entirely on tape cartridges when portions of it may actually be located in faster, hard disk storage. The programming for a virtual tape system is sometimes called a virtual tape server (VTS). Virtual tape can be used with a hierarchical storage management (HSM) system in which data is moved as it falls through various usage thresholds to slower but less costly forms of storage media. Virtual tape may also be used as part of a storage area network (SAN) where less-frequently used or archived data can be managed by a single virtual tape server for a number of networked computers.

FIG. 1 illustrates is a block diagram illustrating the physical hardware components comprising the VTS 100. As shown in FIG. 1, the VTS is installed in several frames: one or more frames 102 comprising physical tape drives 136 such as the IBM Magstar 3590 to which data are recalled to and copied from a tape volume cache 135; a VTS frame 125 comprising key components of the VTS subsystem including an intelligent (VTS) controller 126 and its associated storage management software 128, and, RAID disk arrays 105 which make up the Tape Volume Cache (TVC); and, a Library Manager 140 comprising a virtual and stacked volume inventory and implementing functions for the management of the physical library e.g., tracking the physical position and status-of the tape cartridges. The VTS is connected to a host computing system such as a mainframe or IBM S/390 host 99 by up to sixteen Enterprise Systems Connection (ESCON) channels 115. The VTS may also be attached to a SCSI host by up to eight SCSI busses. This VTS can be dedicated to a SCSI host only or shared with a S/390 host. The tape drives are attached to the VTS controller and the Library Manager only and are dedicated to the function of the VTS. They are not visible to, and therefore cannot be used by, any external host system.

The VTS frame 125 preferably includes a RISC-based processor 126, which provides ESCON as well as SCSI attachments, tape drive emulation to the host system and attachment to the TVC disks 135. The processor in the VTS may be based upon an RS/6000 processor. The storage management software, which manages the TVC contents and stacked volumes, controls the movement of data between a disk (i.e., the TVC) and the tape cartridges, e.g., an IBM Magstar 3590, and automatically fills the tapes.

The Tape Volume Cache (TVC) 135 of the VTS subsystem is the key element that enables the utilization of the tape technology. Buffering host-created volumes and later stacking them on a tape cartridge makes it possible for the cartridge capacity of the technology to be fully utilized. The TVC is a disk buffer where the host emulated tape volumes are written before they are copied to the physical tape cartridges. The host operating system sees tape drives, but actually, the space is represented by storage space in RAID fault-tolerant Serial Storage Architecture (SSA) disk subsystems. All host interaction is through the VTS virtual control unit 126 which handles the migration of data between the disk cache and the tape media in an optimal space and time fashion; the host never writes directly to the tape drives inside the VTS.

With this approach, in addition to fulfilling the objective of making full use of high-capacity tape cartridges, there are additional benefits such as: the emulated volumes are accessed at disk speeds and tape commands such as space, locate, rewind and unload are mapped into disk commands that are completed in tens of milliseconds rather than the tens of seconds required for traditional tape commands; and, multiple, different, emulated volumes can be accessed in parallel because they physically reside in the TVC, i.e., a single virtual volume cannot be shared by different jobs or systems at the same time.

FIG. 2 illustrates the relationship between several virtual and real image of components which are shown to host systems differently. When using a VTS, the host application writes tape data to virtual drives 150. The volumes written by the host are physically stored in the tape volume cache (e.g., a RAID disk buffer) and are called Virtual Volumes 160. The storage management software 128 in the VTS controller 126 copies these virtual volumes in the TVC to the physical cartridges 175 owned by the VTS subsystem. Once a virtual volume is copied or migrated from the TVC to tape, it is called a Logical Volume 180. As virtual volumes 160 are copied from the TVC to a Magstar cartridge (tape), they are "stacked" on the cartridge end to end, taking up only the space written by the host application. This arrangement maximizes utilization of a cartridge's storage capacity. The storage management software manages the location of the logical volumes on the physical cartridges, and the user has no control over the location of the data. When a logical volume 182 is moved from a physical cartridge to the TVC 135, the process is called recall and the volume becomes a virtual volume 162 again. The host cannot distinguish between physical and virtual volumes, or physical and virtual drives and treats them as if they were "real" cartridges and drives because the host's view of the hardware is virtual. That is, all host interaction with tape data in a VTS subsystem is through virtual volumes and virtual tape drives.

The relationship between virtual and logical volumes is readily understood from FIG. 2. That is, in the virtual tape server (VTS) subsystem, a customer tape volume is virtualized in the disk cache. Any access to the virtual volume is through the image stored in the TVC. The virtual tape volume is identified by a volume serial number referred to as a "volser" (generally, a six character name). After a virtual volume is created and/or modified (one or more records are written to the volume) and closed, it is copied onto the physical tape (logical) volume 180. The image of the virtual volume 160 copied to a physical volume 180 when it was closed is a complete version of the virtual volume at the point in time it was closed. If a virtual volume 160 is subsequently opened and modified, when it is closed, that image of the virtual volume is also copied onto physical tape, however it does not overwrite the prior version of the volume since it may have a different size then the previous version. So at any point in time, there may be several versions of the same volume serial number that reside on one or more physical tape volumes.

While the Library Manager in the VTS maintains a database to track which version of a virtual volume is the most current and its location on the physical volumes managed by the VTS, it is the case that during normal VTS operations, only the most current version of a virtual volume is accessible by a host system. It is an expressed concern that the old versions of the virtual volume's data, although not directly accessible by the host system attached to the VTS, could be accessed by a tape drive, compatible with the physical tape volumes used by the VTS, that is directly attached to a host system. In addition, the data associated with the most current version of a virtual volume could have been expired by the customer, but it still will exist on the physical tape volume and could be accessed.

Conventional methods implement the concept of "expiring" data, which entails returning the virtual volume to a "scratch" status which is required as a result of modifying the data associated with a virtual volume in the VTS which creates a new image of the volume. This additionally requires that the old version(s) of the volume must be handled to guarantee that they cannot be recovered.

It would be highly desirable to provide a system and method that guarantees that old or expired versions of a virtual volume cannot be accessed, after a given period of time, through any reasonable means including reading the tape on a tape device directly attached to a host.

It would be highly desirable to provide a function executable in a virtual tape server that guarantees that virtual volume data that has been expired by the customer in the VTS cannot be recovered by any reasonable means after a certain time interval.

SUMMARY OF THE INVENTION

It is an object of the present invention to provide a system and method that guarantees that old or expired versions of a virtual volume cannot be accessed, after a given period of time, through any reasonable means including reading the tape on a tape device directly attached to a host.

It is another object of the present invention to provide a function executable in a virtual tape server that guarantees that virtual volume data that has been expired by the customer in the VTS cannot be recovered by any reasonable means after a certain time interval.

According to the invention, reasonable means includes taking a physical volume from a VTS and reading its data on a standalone tape device.

It is another object of the present invention to provide a function executable in a virtual tape server that guarantees that virtual volume data that has been expired by the customer in the VTS cannot be recovered by any reasonable means after a certain time interval specified by the customer.

In accordance with a preferred embodiment of the invention, there is provided a system and method for guaranteeing overwrite of expired data in a media device, the data being organized according to logical units provided on media devices organized as physical volumes. The method comprises the steps of: maintaining information associated with a status of a physical volume, and updating a physical volume's status information based upon a combination of that volume's prior status and that volume's current status; specifying a time duration that expired logical unit data may remain on a physical volume; based upon the volume's updated status information, determining whether a selected volume has expired data longer than the specified time duration; and, overwriting contents of the volume having data that has been expired longer than the specified time duration.

Advantageously, such a system and method of the invention is implemented in a VTS tape storage system interfaced with a host computer. According to one aspect of the invention, the host may be used to set the time duration. Preferably, the time duration is specified by the customer through a computer console associated with the library manager component.

BRIEF DESCRIPTION OF THE DRAWINGS

Further features, aspects and advantages of the apparatus and methods of the present invention will become better understood with regard to the following description, appended claims, and the accompanying drawings where:

FIG. 3(*b*) illustrates a physical volume table 40 implemented by the VTS system which lists each of the physical volumes 45 in the VTS system and includes one or more volume parameters assigned to each physical volume, according to the invention.

FIG. 4(*b*) depicts a second portion 250 of the novel function that periodically determines which of the physical volumes managed by the VTS comprise data that has been expired for a time duration longer than the user-specified time.

FIG. 4(*c*) depicts a third portion 275 of the novel function that periodically determines whether there are any physical volumes managed by the VTS that includes data that needs to be overwritten.

FIG. 5 is a matrix 300 depicting the various possibilities of prior and current statuses for a physical volume.

DETAILED DESCRIPTION OF THE PREFERRED EMBODIMENTS

The requirement that the old version(s) of the VTS volume must be handled to guarantee that they cannot be recovered is met by overwriting a physical volume that contains invalidated virtual volume data within a time interval specified by the customer.

Thus, there is introduced a function, implemented by the VTS, and particularly, the storage management software component of the VTS, for enabling data associated with a virtual (logic) volume to be invalidated.

In the context of the invention, there is defined an aggregation or group of physical volumes in a VTS that comprise a "pool", with each physical volume including one or more logical (virtual) volumes. Pooling concepts are well known in the industry with IBM's Tivoli Storage Manager being an exemplary system implementing such volume pool concepts. FIG. 3(*a*) illustrates a pool set-up table 20 comprising data for the VTS system indicating how the physical volumes may be organized. As shown in FIG. 3(*a*), each of the physical volumes managed by the VTS system is assigned to a pool, with the table 20 indicating 32 pools, for example. It is understood that each pool 25 of physical volumes is assigned a name and may have one or more parameters 30 associated therewith. For example, typical parameters associated with a pool include, but are not limited to: a media type (e.g., physical volumes having 10 Gbyte tape or 20 Gbyte tape); a rule(s) for managing volumes in a pool. One rule may involve the concept of "reclamation" whereby the VTS tracks what percentage of data associated in a particular physical volume is still valid. That is, over time, data space occupied by a logical volume needs to be reclaimed from a physical volume when it is no longer used or needed by the host, i.e., has expired. Thus, in the pooling table, a reclamation threshold parameter may be set to indicate what percentage of data on the volume is still active. Thus, if any volume(s) in the pool falls below that reclaim percent threshold, then a reclamation process will be performed to take the valid logical volume(s) off of the physical volume and put it on another physical volume—potentially combining multiple partially full physical volumes and filling up the other. The percentage at which a volume is reclaimed is another useful parameter defining the pool.

Figure 1:
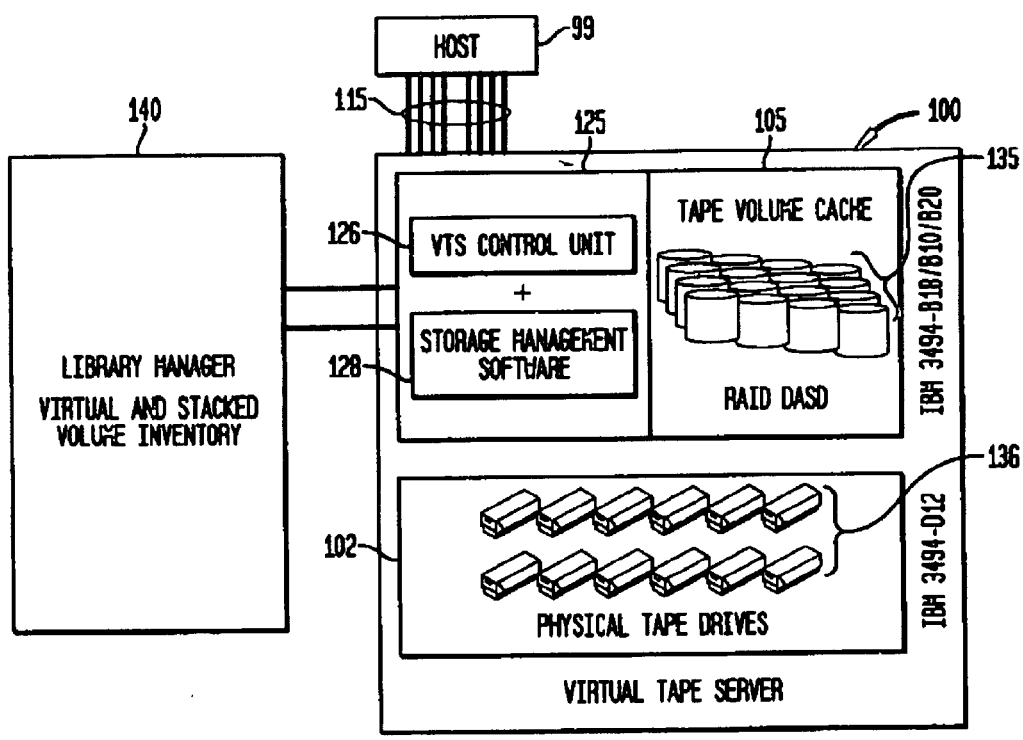
FIG. 1 illustrates is a block diagram illustrating the physical hardware components comprising the VTS 100 according to the prior art.
Figure 2:
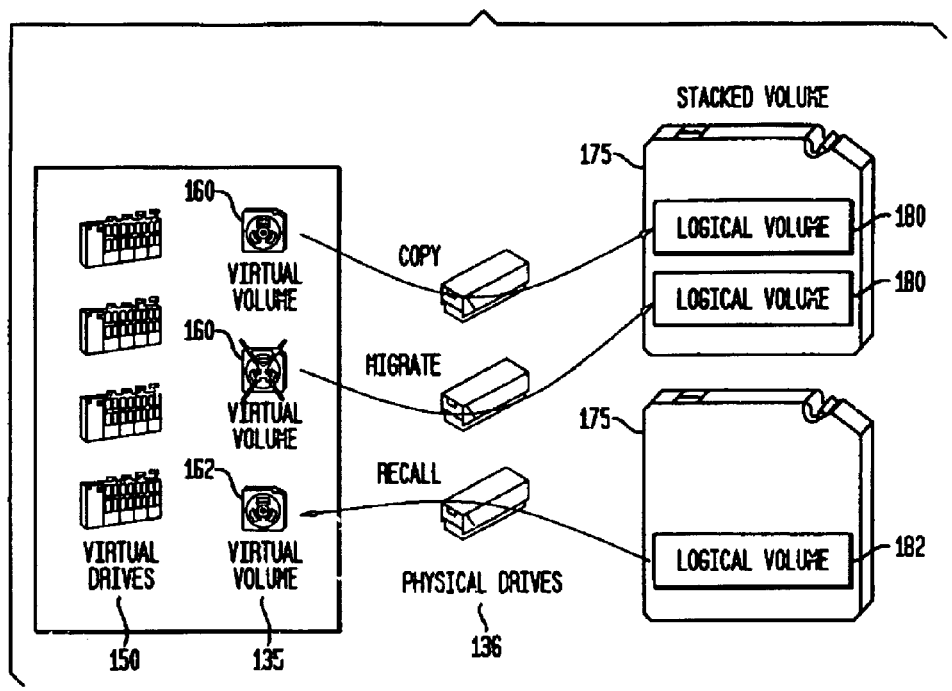
FIG. 2 illustrates the relationship between several virtual and real image of components according to the prior art.
Figure 3A:
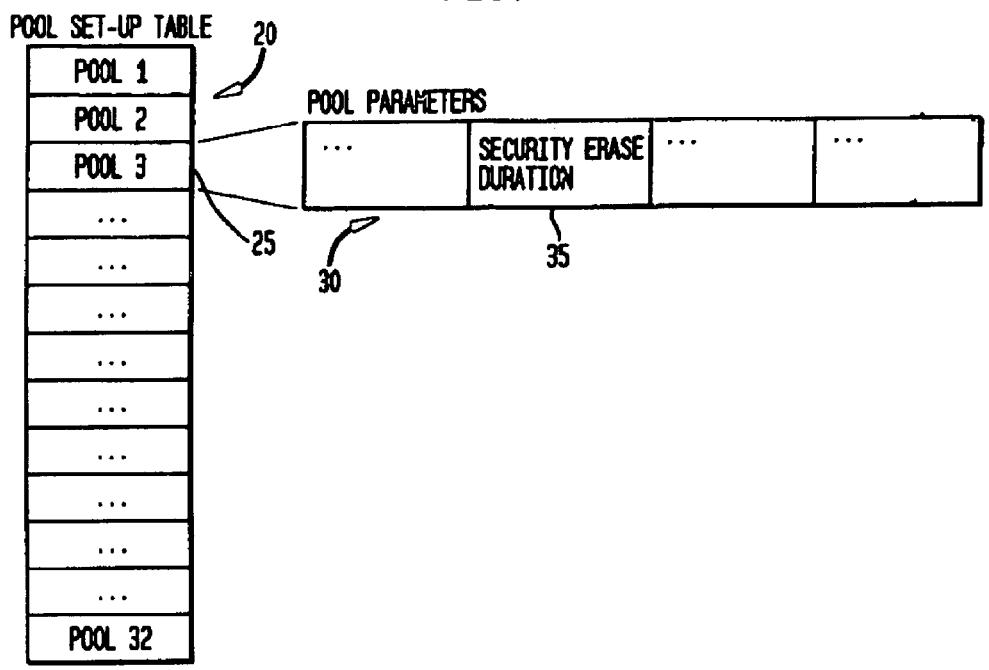
FIG. 3(*a*) illustrates a pool set-up table 20 comprising data for the VTS system indicating how the physical volumes may be organized, according to the invention.

A change in the volumes state (e.g., a private to a "scratch" category) indicates when data is not useful anymore. For purposes of the invention, as shown in FIG. 3(a), an additional parameter, security_erasure_duration (SED) 35 is defined for a storage pool in the VTS that specifies the number of days expired virtual volume data can remain on a physical volume until it must be overwritten. Valid values for this parameter may include zero (0) days or anywhere from 7 to 90 days, for example. A value of 0 indicates that there is no erasure requirement for the pool. Thus, for a given pool, it is desired to assure that after a certain time interval, expired data on a physical volume is no longer accessible through any normal means, e.g., by overwriting. The SED parameter 35 is a user-defined parameter associated with a pool indicating that the user does not want any expired data on a physical volume that is older than a certain time interval, for example, thirty (30) days old.

Figure 3B:
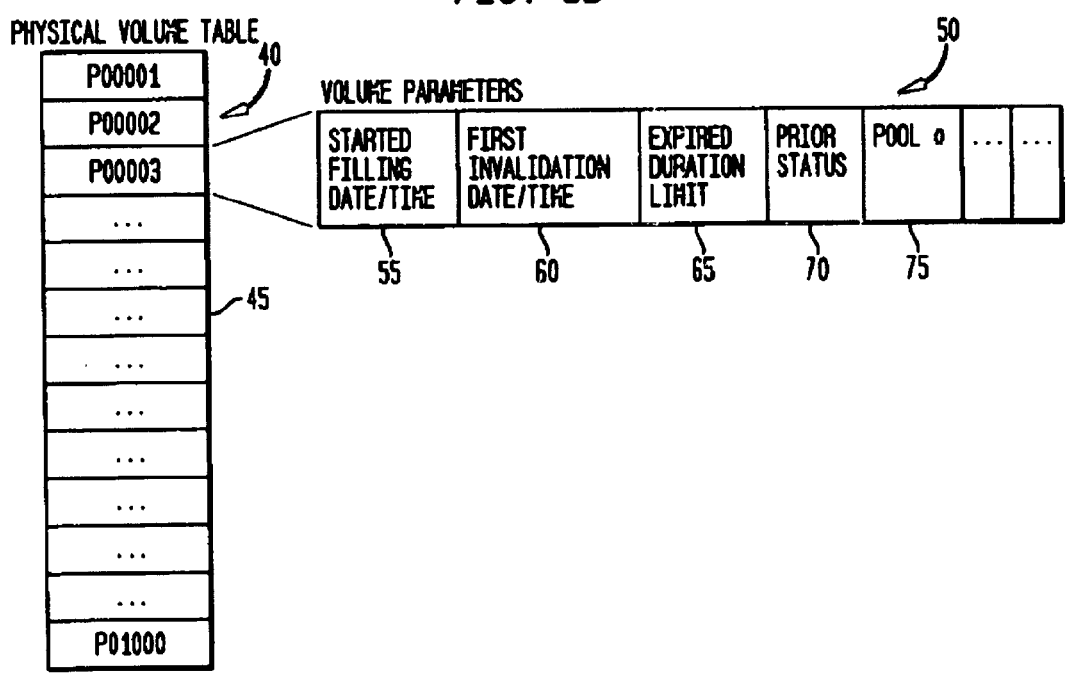

As shown in FIG. 3(b), there is illustrated a Physical Volume table 40 implemented by the VTS system which lists each of the physical volumes 45 in the system and includes one or more volume parameters 45 assigned to each physical volume and utilized by the VTS system functions. Four parameters, in particular, relevant to the status tracking information maintained for each physical volume include: a Started_Filling_Date (SFD) parameter 55 that records the date and time value that the physical volume transitions from a "scratch" status to a "filling" status; a First_Invalidation_Date (FID) parameter 60 that records the date and time value when the physical volume transitions from scratch, filling or 100% fall to not 100% full; an Expired_Duration_Limit (EDL) parameter 65 which holds the user-defined security_erasure_duration value 35 defined for the pool the physical volume was in when it last had data written on it; and, a Prior_Status parameter 70 which is assigned a value indicating whether the volume's prior status was scratch, filling, 100% full or not 100% full; and a pool parameter 75 indicating the pool for which the physical volume is assigned.

Figure 4A:
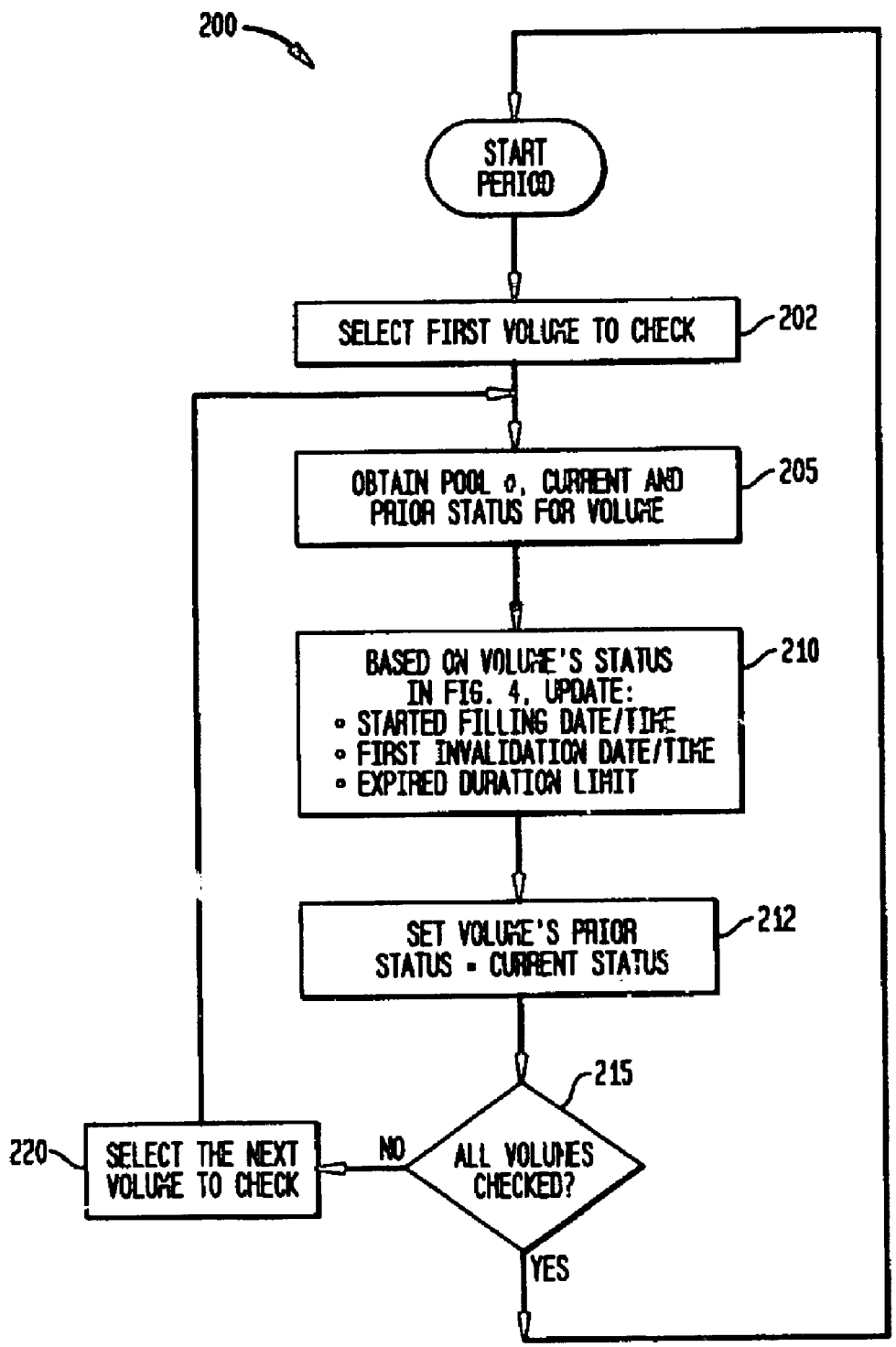
FIG. 4(*a*) depicts a first portion 200 of the novel function that periodically ascertains the status of all physical volumes managed by the VTS and updates the volume parameters for every physical volume.

The algorithm for ensuring expired data overwrite for physical volumes performed by the VTS is now described with respect to FIGS. 4(a)–4(c). The first portion of the algorithm, depicted in FIG. 4(a), is to implement a function 200 that periodically ascertains the status of all physical volumes managed by the VTS and updates the volume parameters for every physical volume (volume parameters 50 in FIG. 3(b)). For purposes of discussion, it is assumed that this function 200 is executed by the VTS on an hourly basis, however it is understood that it may be executed on any periodic basis, e.g., hourly, half-hourly, etc. or any other granularity as appropriate. As shown in FIG. 4(a), the first step 202 of the function is to select a first physical volume to be processed, e.g., for each pool. Then, at step 205, there is performed the step of obtaining the pool number associated with the physical volume and, ascertaining the prior status of the volume, as determined at the time of the previous iteration of this portion of the algorithm, from the physical volume pool table, and, to dynamically ascertain that volume's current status as maintained by the VTS.

FIG. 5 depicts a status matrix 300 setting forth the types of prior and current statuses for a physical volume. The statuses maintained for a physical volume include: a scratch status (meaning no valid data on the volume), a filling status (meaning that physical volume is now being filled with valid data), a 100% full status (meaning that the physical volume is full of valid data), and, a less than 100% full status, i.e., <100% full (meaning that physical volume has a logical volume, for instance, that is no longer valid).

According to the preferred embodiment, the function implemented by the VTS for guaranteeing data overwrite according to user-defined times, is applicable when the host computer has expired or communicated to the VTS that the data associated with a logical volume is no longer valid. How data is invalidated is not critical to the invention, however, typically, the VTS will invalidate data associated with a logical volume in the following scenarios including, but not limited to: 1) when a host computer has assigned the virtual volume to a scratch category. The volume is subsequently selected for a scratch mount and data is written to the volume. The older version of the volume is now invalid; 2) when a host has assigned the virtual volume to a scratch category that has a fast-ready attribute set, the category has a non-zero delete expired data parameter value and that parameter value has been exceeded and the VTS has deleted the virtual volume. All versions of the volume are now invalid; and 3) when a host has modified the contents of the volume. This could include a complete re-write of the volume or additional data appended to it. The older version of the volume is now invalid.

As the customer may not want all of the data written to a VTS to be a candidate for this function, the function may be built on top of the volume pooling function of the VTS. Thus, a customer may control what data is applicable to the erasure requirement.

Returning to FIG. 4(a), key to the function is the updating of the various status tracking parameters for the physical volume which is indicated at step 210. As shown in FIG. 4(a), at step 210, the parameters to be updated include the SFD, FID and EDL described herein. According to the preferred embodiment, as shown in the status matrix 300 of FIG. 5, the updating of a volume's status is based upon the combination of that volume's prior status, as indicated by a row 302–308, and that volume's current status as indicated by the columns 312–318. As indicated at step 210, based on the combination of prior versus current status, the SFD, FID and EDL parameters are updated. For instance, in view of FIG. 5, if a volume's prior status was scratch 302 and that volume is ascertained as filling with data 314 in a current iteration, then the following updates are performed as indicated in the matrix box 320: the SFD volume parameter will be set equal to the current date/time (i.e., date/time of that current iteration), and a check is made as to whether the EDL value is set to zero (0) and, if so, the EDL parameter will be set to the pool's SED value. Returning to FIG. 4(a), at step 212, after updating the volume parameters, that volume's prior status is set equal to the current status. Then, at step 215 a determination is made as to whether all physical volumes have been checked in this current iteration. If not, then at step 220, the next volume to be checked is selected and the process returns to step 205. Otherwise, at step 215, the process idles until performing the next status check interval for the volumes in the next periodic interval, e.g., the next hour.

The next portion of the algorithm, depicted in FIG. 4(b), is to implement a function 250 that periodically determines which of the physical volumes managed by the VTS comprise data that has been expired for a time duration longer than the user-specified time. For purposes of discussion, it is assumed that this function 250 is executed by the VTS on a daily basis, however it is understood that it may be executed on any periodic basis, e.g., every 12 hours, etc. or any other granularity as appropriate. As shown in FIG. 4(b), the first step 252 of the function is to select a first physical volume to be processed, e.g., for each pool. Then, at step 255, there is performed the step of determining whether the EDL parameter value is zero which indicates that this volume has no expired data or no expiration limit. If it is determined that the expired duration limit is zero (0), then the process proceeds to step 272 where a determination is made as to whether all physical volumes have been checked in this current iteration. If all physical volumes have not been checked, then at step 273, the next volume to be checked is selected and the process returns to step 255. Otherwise, at step 272, the process idles until performing this function 250 for the volumes in the next periodic interval, e.g., the next day. Returning to step 255, if it is determined that the EDL parameter value is not equal to zero, this indicates that this volume has an expiration limit set, then the process proceeds to step 258 to determine whether the FID parameter is equal to zero (0).

If the FID value is non-zero, then this means an invalidation cycle has occurred, i.e. this volume has invalid data. Then, at step 260, a determination is made as to whether the duration for that invalid data has exceeded the user-defined threshold. Thus, at step 260, a determination is made as to whether the current date/time value is equal to or greater then the FID plus the EDL value. In one example scenario, an EDL parameter value would be set as part of the action taken when a volume's status changes from scratch to filling for example, as shown in the action taken in matrix box 320, FIG. 5. If the current date/time value is equal to or greater then the FID value plus the EDL value, then residual expired data on the volume has not been overwritten by the time limit. The residual data on the volume must then be over written. Thus, as indicated at step 268, that volume is added to a list of volumes to overwrite. Otherwise, at step 260, if the current date/time value is not equal to or greater then the FID value plus the EDL value, then the process returns to step 272 to determine the next volume to be checked.

Returning to step 258, FIG. 4(b), if it is determined that the FID parameter value is equal to zero (0), there still exists the possibility of expired data even though this has not yet been detected in the hourly processing (FIG. 4(a)). Thus, the process proceeds to step 262 to determine whether the volume's prior status is scratch or filling which is directed to the example case when data is starting to be written to a volume and that volume never gets filled, i.e., the probability exists that some data on that volume has been expired even though the trigger, to set the FID, is set only when the volume goes from 100% full to less than 100% full. If the volume never fills up with data, this trigger will never be set. Thus, if that volume's prior status does not equal scratch or filling, then this maybe a full volume (100% full) with no expired data, and the process proceeds to step 272 to determine the next volume to be checked. If, at step 262, it is determined that the volume's prior status is scratch or filling, then it is not determinable whether data on that volume has expired. Thus, the process proceeds to step 265 to determine whether the current date/time value is equal to or greater then the SFD parameter value plus the EDL parameter value. If the current date/time value is equal to or greater then the SFD parameter value plus the EDL parameter value, then residual expired data could exist on that volume that has not been overwritten by the time limit and the volume is added to a list of volumes to overwrite at step 268. As mentioned, this covers the case where a new or volume that has been subject to a Data Security Erase (DSE) begins filling but never gets to 100% full within the EDL time limit for the pool. Otherwise, at step 265, if the current date/time value is not equal to or greater then the SFD parameter value plus the EDL parameter value, then the process returns to step 272 to determine the next volume to be checked.

The next portion of the algorithm, depicted in FIG. 4(c), is to implement a function 275 that periodically determines whether there are any physical volumes managed by the VTS that includes data that needs to be overwritten, i.e., data that has been expired for a time duration longer than the user-specified time. For purposes of discussion, it is assumed that this function 275 is executed by the VTS on an hourly basis, however it is understood that it may be executed on any periodic basis, e.g., every half-hour, etc. or any other granularity as appropriate. As shown in FIG. 4(c), at step 280, a determination is made as to whether there are any volumes on the overwrite list, i.e., the list prepared at FIG. 4(b), step 268. If there are no volumes on the overwrite list the process remains idle until the next start period. At such a time, as depicted at step 282, a volume is selected from the list, and at step 285, a determination is made as to whether the current status of that physical volume is equal to scratch status (no active data). If the current status is not equal to scratch status, then that volume includes valid data which is first reclaimed then returned to scratch status at step 288. As understood to skilled artisans, reclamation includes transferring any valid logical volume data from a first physical volume to another physical volume prior to rendering that first physical volume to scratch status. If, at step 285, the current status is equal to scratch status, then the process proceeds directly to step 290. Whether the current volume's status is already scratch or is returned to scratch status after reclamation, a random data pattern may be written over the entire volume at step 290.

Particularly, as depicted in FIG. 4(c) at step 290, a physical drive managed by the VTS is acquired and the volume is mounted on the drive and a Data Security Erase (DSE) command is then issued to the drive. The DSE command will completely overwrite the physical volume with random data to ensure that the expired data is unrecoverable. As an alternative to random data, it should be understood that other types of data may be written during this step, e.g., fixed, nulls, etc. It should be further understood that alternative overwrite methods may be employed at this step. For example, in older systems, the physical tape may be magnetically degaussed. When the DSE command has successfully completed, i.e., after volume overwrite, the process proceeds to step 292 where that volume's SFD, FID and EDL values are reset to zero (0) value. At a final step 295, the volume is removed from the overwrite list and the process returns to step 280 to check the overwrite list for the next volume.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims. For example, event though it has been described that the status of all physical volumes and updating of the volume parameters occurs periodically, it is understood that these functions may be performed on an event driven basis.

What is claimed is:

1. A method for guaranteeing overwrite of data stored in a media device when the data has expired, wherein the data is organized in logical units provided on the media device, and the media device is organized in respective physical volumes, said method comprising:
   a) maintaining status information associated with each respective physical volume, and updating the status information of each respective physical volume based on a prior status and a current status thereof to provide updated status information;
   b) specifying a time duration in which expired data may remain on each respective physical volume;
   c) based upon the updated status information thereof, determining whether at least a selected one of the physical volumes has data that has been expired for a duration that is longer than the specified time duration thereof;
   d) adding the at least a selected one of the physical volumes to a list of physical volumes to be overwritten when it is determined in the stet c) that the at least a selected one of the physical volumes has the data that has been expired for the duration that is longer than the specified time duration; and
   (e) overwriting contents, including the expired data, of physical volumes on the list of physical volumes to be overwritten so that the expired data thereof cannot be read by the media device.

2. The method of claim 1, wherein the logical units are aggregated in a storage pool spanning a plurality of the respective physical volumes, said method further including:
   enabling a user to specify, for the storage pool, the time duration in which the expired data may remain on each of the respective physical volumes associated therewith.

3. The method of claim 1, wherein each of the prior status and the current status associated with each of the respective physical volumes comprises one of:
   a scratch status indicating that the physical volume has no useful data;
   a filling status indicating that the physical volume is currently being filled with valid data;
   a 100% full status indicating that the physical volume is full of valid data; and,
   a less than 100% full status indicating that the physical volume has a logical unit comprising data that is no longer valid.

4. The method of claim 3, wherein the maintaining status information comprises, for each of the respective physical volumes:
   maintaining a first status parameter indicating a time when the physical volume transitions from a prior, scratch status to a current, filling status; and
   maintaining a second status parameter indicating a time when the physical volume transitions from one of the scratch, filling and 100% full statuses, to the less than 100% full status, thereby indicating a presence of invalid data.

5. The method of claim 4, wherein the updating the status information comprises, for each of the respective physical volumes:
   updating the first status parameter when a combination of the prior status and the current status indicates a transition from the prior, scratch status to the current, filling status; and
   updating the second status parameter when a combination of the prior status and the current status indicates a transition from one of the scratch, filling and 100% full statuses to the less than 100% full status.

6. The method of claim 5, wherein the maintaining status information comprises, for each of the respective physical volumes:
   maintaining a third status parameter indicating a user-specified time duration in which the expired data may remain on the physical volume; and,
   updating the third status parameter when the physical volume's current status indicates a transition to at least one of the filling status and the 100% full status.

7. The method of claim 6, further comprising, for each of the respective physical volumes:
   setting the prior status of the physical volume to its current status after updating the first, second and third status parameters thereof.

8. The method of claim 6, wherein the determining step c) comprises, for each of the respective physical volumes:
   determining whether the physical volume has an expiration limit set as indicated by the third status parameter, and, if the expiration limit has been set, determining whether an invalidation cycle has occurred as indicated by the second status parameter.

9. The method of claim 8, wherein the determining whether the invalidation cycle has occurred comprises, for each of the respective physical volumes:
   checking whether the current date and time is greater than or equal to a sum of the second and third status parameters, in which case the physical volume comprises data to be overwritten.

10. The method of claim 8, wherein, for each of the respective physical volumes, if the expiration limit has been set, and the invalidation cycle has not occurred, the method further comprises:
    determining whether the physical volume's prior status is the scratch or filling status, indicating that a probability exists that some data on that physical volume has expired; and, if the physical volume's prior status is the scratch or filling status, checking whether the current date and time is greater than or equal to a sum of the first and third status parameters, in which case the physical volume comprises data to be overwritten third.

11. The method of claim 3, wherein said step d) comprises, for each of the respective physical volumes:
    determining whether the current status of the physical volume is the scratch status; and, if the current status of the physical volume is the scratch status, writing a data pattern over an entirety of the physical volume.

12. The method of claim 1, wherein the overwriting comprises writing a random data pattern over the physical volumes on the list of physical volumes to be overwritten.

13. The method of claim 11, wherein, for each of the respective physical volumes, if the current status of the physical volume is not the scratch status, the method further comprises:

performing a reclamation process on the physical volume to render the physical volume's current status to the scratch status prior to the writing of the data pattern.

14. The method of claim 7, further comprising, for each of the respective physical volumes:

resetting the first, second and third status parameters after the step d).

15. A program storage device readable by machine, tangibly embodying a program of instructions executable by the machine to perform a method for guaranteeing overwrite of data stored in a media device when the data has expired, wherein the data is organized in logical units provided on the media device, and the media device is organized in respective physical volumes, said method comprising:

a) maintaining status information associated with each respective physical volume, and updating the status information of each respective physical volume based on a prior status and a current status thereof to provide updated status information;

b) specifying a time duration in which expired data may remain on each respective physical volume;

c) based upon the updated status information thereof, determining whether a selected one of the physical volumes has data that has been expired for a duration that is longer than the specified time duration thereof;

d) adding the at least a selected one of the physical volumes to a list of physical volumes to be overwritten when it is determined in the step c) that the at least a selected one of the physical volumes has the data that has been expired for the duration that is longer than the specified time duration; and (e) overwriting contents, including the expired data, of physical volumes on the list of physical volumes to be overwritten so that the expired data thereof cannot be read by the media device.

16. The program storage device of claim 15, wherein the logical units are aggregated in a storage pool spanning a plurality of the respective physical volumes, said method further including:

enabling a user to specify, for the storage pool, the time duration in which expired data may remain on each of the respective physical volumes associated therewith.

17. The program storage device of claim 15, wherein each of the prior status and the current status associated with each of the respective physical volumes comprises one of:

a scratch status indicating that the physical volume has no useful data;

a filling status indicating that the physical volume is currently being filled with valid data;

a 100% full status indicating that the physical volume is full of valid data; and, a less than 100% full status indicating that the physical volume has a logical unit comprising data that is no longer valid.

18. The program storage device of claim 17, wherein the maintaining status information comprises, for each of the respective physical volumes:

maintaining a first status parameter indicating a time when the physical volume transitions from a prior, scratch status to a current, flung status; and maintaining a second status parameter indicating a time when the physical volume transitions from one of the scratch, filling and 100% full statuses, to the less than 100% full status, thereby indicating a presence of invalid data.

19. The program storage device of claim 18, wherein the updating the status information comprises, for each of the respective physical volumes:

updating the first status parameter when a combination of the prior status and the current status indicates a transition from the prior, scratch status to the current, filling status; and updating the second status parameter when a combination of the prior status and the current status indicates a transition from one of the scratch, filling and 100% full statuses to the less than 100% full status.

20. The program storage device of claim 19, wherein the maintaining status information comprises, for each of the respective physical volumes:

maintaining a third status parameter indicating a user-specified time duration in which the expired data may remain on the physical volume; and, updating the third status parameter when the physical volume's current status indicates a transition to at least one of the current filling status and the 100% full status.

21. The program storage device of claim 20, further comprising, for each of the respective physical volumes:

setting the prior status of the physical volume to its current status after updating the first, second and third status parameters thereof.

22. The program storage device of claim 20, wherein the determining step c) comprises, for each of the respective physical volumes:

determining whether the physical volume has an expiration limit set as indicated by said the status parameter; and, if the expiration limit has been set, determining whether an invalidation cycle has occurred as indicated by the second status parameter.

23. The program storage device of claim 22, wherein the determining whether the invalidation cycle has occurred comprises, for each of the respective physical volumes:

checking whether the current date and time is greater than or equal to a sum of the second and third status parameters, in which case the physical volume comprises data to be overwritten.

24. The program storage device of claim 22, wherein, for each of the respective physical volumes, if the expiration limit has been set, and the invalidation cycle has not occurred, the method further comprises:

determining whether the physical volume's prior status is the scratch or filling status, indicating that a probability exists that some data on the physical volume has expired; and, if the physical volume's prior status is the scratch or filling status, checking whether the current date and time is greater than or equal to a sum of the first and third status parameters, in which case the physical volume comprises data to be overwritten.

25. The program storage device of claim 17, wherein said step d) comprises, for each of the respective physical volumes:

determining whether the current status of the physical volume is the scratch status; and, if the current status of the physical volume is the scratch status, writing a data pattern over an entirety of the physical volume.

26. The program storage device of claim 15, wherein the overwriting comprises writing a random data pattern over the physical volumes on the list of physical volumes to be overwritten.

27. The program storage device of claim 25, wherein, for each of the respective physical volumes, if the current status of the physical volume is not the scratch status, the method further comprises:

performing a reclamation process on the physical volume to render the physical volume's current status to the scratch status prior to the writing of the data pattern.

28. The program storage device of claim 21, wherein the method further comprises, for each of the respective physical volumes:

resetting the first, second and third status parameters after the step d).

29. A virtual tape storage system comprising a tape media device for storing user data organized in logical wilts provided on the tape media device, the tape media device organized in respective physical volumes, said system comprising:

a) a host system interface for receiving a user instruction that specifies a time duration in which expired data for the user may remain on each respective physical volume;

b) a control device for maintaining status information associated with each respective physical volume, and updating the status information of each respective physical volume based on a prior status and a current status thereof to provide updated status information;

c) means for determining, based on the updated status information thereof, whether a selected one of the respective physical volumes has data that has been expired fur a duration that is longer than the specified time duration thereof; and, d) means fur adding the at least a selected one of the physical volumes to a list of physical volumes to be overwritten when it is determined by the means for determining that the at least a selected one of the physical volumes has the data that has been expired for the duration that is longer than the specified time duration; and, e) means for overwriting contents, including the expired data, of physical volumes on the list of physical volumes to be overwritten so that the expired data thereof cannot be read by the tape media device.

30. The method of claim 1, wherein the logical wilts are aggregated in a plurality of storage pools, each storage pool spanning a different plurality of the respective physical volumes, said method further comprising:

enabling a user to specify, for each of the storage pools, the time duration in which expired data may remain on each of the respective physical volumes associated therewith.

31. The method of claim 1, wherein each of the prior status and the current status associated with each of the respective physical volumes comprises one of:

a scratch status indicating that the physical volume has no useful data;

a filling status indicating that the physical volume is currently being filled with valid data;

a 100% full status indicating that the physical volume is full of valid data; and a less than 100% full status indicating that the physical volume has a logical unit comprising data that is no longer valid; and the maintaining status information comprises maintaining at least one status parameter indicating a time when the physical volume transitions from one of the scratch, filling and 100% full statuses, to the less than 100% full status, thereby indicating a presence of invalid data.

32. The program storage device of claim 15, wherein the logical units are aggregated in a plurality of storage pools, each storage pool spanning a different plurality of the respective physical volumes, said method further comprising:

enabling a user to specify, for each of the storage pools, the time duration in which expired data may remain on each of the respective physical volumes associated therewith.

33. The program storage device of claim 15, wherein each of the prior status and the current status associated with each of the respective physical volumes comprises one of:

a scratch status indicating that the physical volume has no useful data;

a filling status indicating that the physical volume is currently being filled with valid data;

a 100% full status indicating that the physical volume is full of valid data; and a less than 100% full status indicating that the physical volume has a logical unit comprising data that is no longer valid; and the maintaining status information comprises maintaining at least one status parameter indicating a time when the physical volume transitions from one of the scratch, filling and 100% full statuses, to the less than 100% full status, thereby indicating a presence of invalid data.

34. The virtual tape storage system of claim 29, wherein the logical units are aggregated in a plurality of storage pools, each storage pool spanning a different plurality of the respective physical volumes, said system further comprising:

means for enabling a user to specify, for each of the storage pools, the time duration in which expired data may remain on each of the respective physical volumes associated therewith.

35. The virtual tape storage system of claim 29, wherein each of the prior status and the current status associated with each of the respective physical volumes comprises one of:

a scratch status indicating that the physical volume has no useful data;

a filling status indicating that the physical volume is currently being filled with valid data;

a 100% full status indicating that the physical volume is full of valid data; and a less than 100% full status indicating that the physical volume has a logical unit comprising data that is no longer valid; and the control device maintains the status information by maintaining at least one status parameter indicating a time when the physical volume transitions from one of the scratch, filling and 100% full statuses, to the less than 100% full status, thereby indicating a presence of invalid data.

* * * * *